INVENTOR
D. E. LUPFER

_United States Patent Office_

3,174,824
Patented Mar. 23, 1965

3,174,824
METHOD OF PRODUCING AN AQUEOUS SOLUTION OF AMMONIUM NITRATE OF PREDETERMINED CONCENTRATION AND APPARATUS THEREFOR
Dale E. Lupfer, Bartlesville, Okla., assignor to Phillips Petroleum Company, a corporation of Delaware
Original application Oct. 1, 1956, Ser. No. 613,289, now Patent No. 3,026,710, dated Mar. 27, 1962. Divided and this application Mar. 26, 1962, Ser. No. 182,162
8 Claims. (Cl. 23—103)

The present application is a division of Serial No. 613,289, filed October 1, 1956, now U.S. Patent No. 3,026,710.

This invention relates to the measurement of the concentration of aqueous ammonium nitrate solutions. In another aspect it relates to the production of ammonium nitrate solutions of predetermined concentrations.

Ammonium nitrate is commonly prepared in the form of small pellets or prills for use as fertilizer. These prills can be formed by spraying liquid ammonium nitrate into the top of a prilling tower. The droplets solidify in descending through the tower to form the prills. It is important that the concentration of the aqueous ammonium nitrate solution which is to be prilled be maintained within a very narrow range from about 94.5 to 96.0 percent, and preferably within the range of 95.0 to 95.5 percent ammonium nitrate by weight. Solutions having concentrations outside this range generally do not produce satisfactory prills. A more concentrated solution may tend to solidify or freeze in the spray head of the prilling tower. A less concentrated solution tends to produce mushy or oblong prills which contain an excessive amount of water and tend to cake when bagged and put into storage.

Control procedures have been devised for maintaining the concentration of the ammonium nitrate solution at a predetermined value. These control procedures have been based upon periodic analyses of samples of the ammonium nitrate solution passed to the prilling tower. The analyses have generally been based upon measurements of the fudge point of the solution. The fudge point of such a solution is the temperature at which the nuclei of ammonium nitrate crystals begin to form when a concentrated aqueous solution of ammonium nitrate is cooled. The fudge point of a concentrated aqueous solution of ammonium nitrate is in a general way proportional to the concentration of the solution. While control procedures based upon this measurement have been reasonably effective in controlling ammonium nitrate prilling operations, the analysis has been somewhat time consuming and has not been able to provide a continuous control.

In accordance with the present invention, a novel analyzer is provided which is capable of measuring continuously the concentration of a sample of an aqueous ammonium nitrate solution. This analyzer is based upon the discovery that the opaqueness and the viscosity of such solutions change abruptly at the fudge point. A sample of the material to be analyzed is circulated continuously through a sample cell. In one embodiment of this invention, a beam of radiation is transmitted through the cell, and the transmitted radiation is measured. The temperature of the sample passed through the cell is adjusted in response to this measurement so that the light transmission remains constant. The temperature of the solution in the sample cell is then representative of the concentration of the measured solution. A measurement of this temperature provides information which can be utilized to control the concentration of the ammonium nitrate solution passed to the prilling tower. In a second embodiment of this invention, a similar control system is based upon maintaining the viscosity of the solution in the sample cell constant.

Accordingly, it is an object of this invention to provide a method of and apparatus for preparing ammonium nitrate solutions of predetermined concentrations.

Another object is to provide apparatus for measuring the concentration of ammonium nitrate solutions.

A further object is to provide apparatus for detecting changes in the opaqueness of sample fluids.

Other objects, advantages and features of this invention should become apparent from the following detailed description which is taken in conjunction with the accompanying drawing in which.

Figure 1:
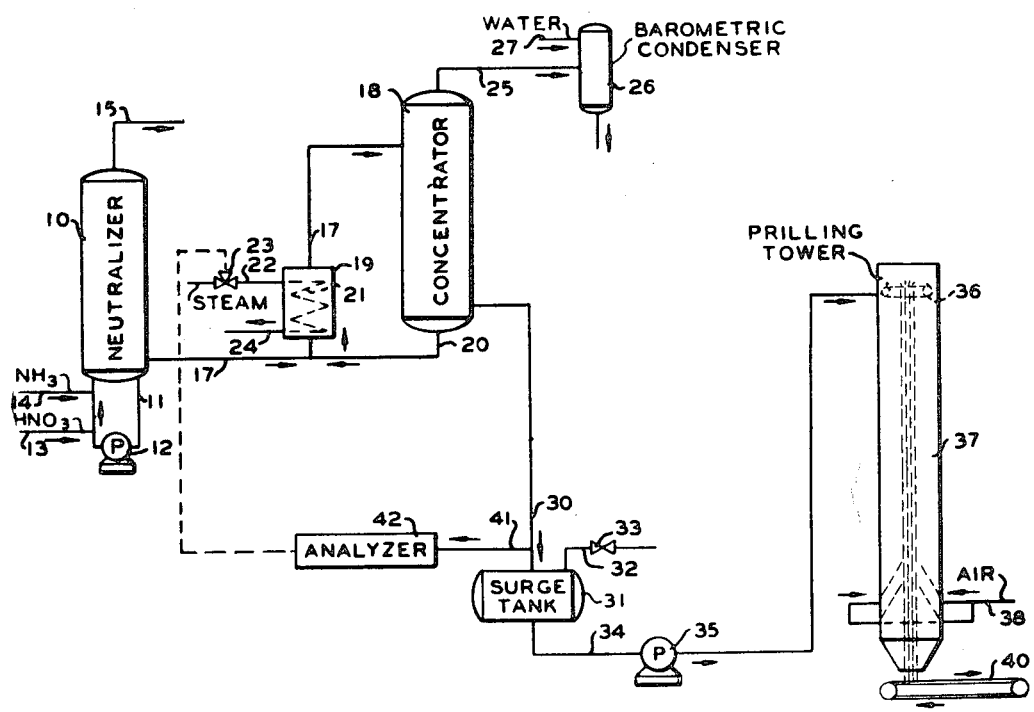
FIGURE 1 is a schematic representation of an ammonium nitrate prilling process having the control system of the present invention incorporated therein.

Referring now to the drawing in detail and to FIGURE 1 in particular, there is shown a schematic representation of apparatus which can be employed to produce aqueous ammonium nitrate solutions and to form prills of ammonium nitrate. The ammonium nitrate is produced by the reaction of gaseous ammonia with nitric acid. The reaction is carried out in a neutralizer vessel 10 which is designed to receive a proper ratio of ammonia gas and nitric acid in a circulating stream. A substantial amount of the resulting ammonium nitrate solution is withdrawn from the bottom of neutralizer 10 through a conduit 11 which has a pump 12 therein. A conduit 13 introduces aqueous nitric acid into conduit 11 on the discharge side of pump 12. The gaseous ammonia is then introduced into conduit 11 through a conduit 14 to neutralize the circulating stream. The resulting solution is returned to neutralizer 10 through conduit 11. The temperature rise due to the heat of reaction causes evaporation of the water and concentration of the ammonium nitrate solution in neutralizer 10. The steam which is formed by the heat of reaction is removed from neutralizer 10 through a conduit 15. The reaction generally is controlled so that the pH of the condensed stream removed through conduit 15 is within the range of approximately 9 to 11, which indicates an excess of ammonia. This excess is desired so that no excess nitric acid is contained in the finished product.

The ammonium nitrate solution is removed from neutralizer 10 through a conduit 17 which communicates with a concentrator 18 through a heat exchanger 19. A portion of the liquid in concentrator 18 is also delivered to the inlet of heat exchanger 19 by means of a conduit 20. Steam or other heating medium is introduced into a coil 21 in heat exchanger 19 by means of an inlet conduit 22 which has a control valve 23 therein. The spent steam is removed through an outlet conduit 24. The ammonium nitrate solution in concentrator 18 is heated sufficiently to increase the concentration of the solution to the desired range of from approximately 94.5 to 96.0 percent. The resulting steam is removed from concentrator 18 through a conduit 25 which communicates with a barometric condenser 26. Cooling water is introduced into condenser 26 through a conduit 27. Condenser 26 maintains the pressure in concentrator 18 less than atmospheric to facilitate the concentration process.

The concentrated ammonium nitrate solution is withdrawn from concentrator 18 through a conduit 30 which communicates with a surge tank 31. Because of the reduced pressure in concentrator 18, a liquid level normally exists in conduit 30 above the top of surge tank 31. Any excess pressure in tank 31 can be vented through a conduit 32 which has a valve 33 therein. The ammonium nitrate solution in tank 31 is removed through a conduit 34 which has a pump 35 therein. This solution is passed to a spray head 36 in the top of a prilling tower 37. Air is introduced into the lower region of tower 37 by means of an inlet conduit 38. The ammonium nitrate droplets solidify in descending through the rising column of air in tower 37 so that solid prills are removed from the bottom of tower 37 by a conveyor belt 40.

In accordance with the present invention, a sample stream of the ammonium nitrate solution supplied to tower 37 is directed by means of a conduit 41 to an analyzer 42. Conduit 41 can conveniently communicate with conduit 30 at a region above surge tank 31. Analyzer 42 provides an output signal which is representative of the concentration of the ammonium nitrate solution. This signal controls the operation of the concentrating process so that the ammonium nitrate solution directed to tower 37 is maintained at a predetermined concentration. This control can conveniently be accomplished by adjusting valve 23 to regulate the amount of steam supplied to heat exchanger 19.

Figure 2:
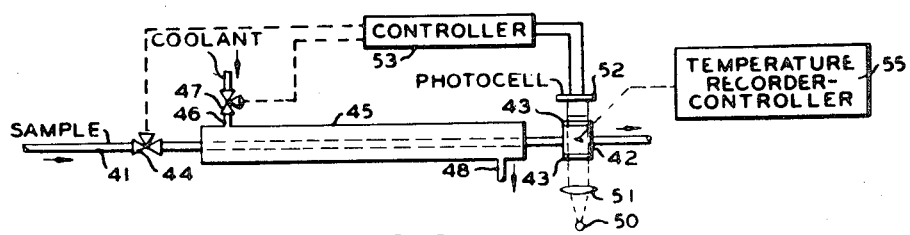
FIGURE 2 is a schematic representation of a first embodiment of the analyzer of this invention.

A first embodiment of analyzer 42 is illustrated in FIGURE 2. The fluid sample removed from condiut 30 is directed through conduit 41 to a sample cell 42 which is provided with radiation transparent windows 43. A control valve 44 is provided in conduit 41 to permit adjustment of the rate of flow into cell 42. Conduit 41 is also provided with a jacket 45 through which a coolant can be circulated. This coolant is introduced into jacket 45 through a conduit 46 which has a control valve 47 therein, and is removed through an outlet conduit 48. A beam of visible radiation from a light source 50 is directed by a lens 51 through cell 42 to impinge upon a photocell 52. Photocell 52 provides an output signal to a controller 53 which is representative of the amount of radiation transmitted through cell 42. Photocell 52 can conveniently be a photovoltaic cell. Controller 53 can be a conventional commercially available instrument which provides an output signal that is proportional to the input electrical signal applied thereto. The output signal can be a pneumatic pressure, for example. This output signal is applied to control valve 44 and/or control valve 47. The temperature within cell 42 is measured by a temperature recorder-controller 55 which can be any known commercially available instrument. Such instruments employ thermocouples or thermistors as sensing elements, for example.

Figure 3:
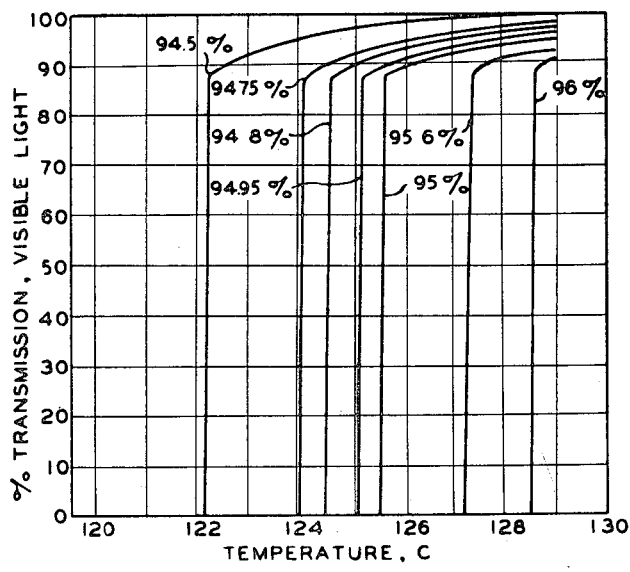
FIGURE 3 is a graphical representation of operating features of the analyzer of FIGURE 2.

The analyzer of FIGURE 2 is as based upon the discovery that the light transmission properties of an aqueous ammonium nitrate solution decrease rapidly when the solution is cooled to the fudge point. It is known that the fudge point varies considerably for different concentrations of ammonium nitrate solutions in a general range of approximately 94.5 to 96 percent. The curves shown in FIGURE 3 illustrate this decrease in light transmission of ammonium nitrate solutions of several concentrations at different temperatures. The rapid changes in light transmission occur at the fudge points of the solutions. The curves shown in FIGURE 3 were obtained by measuring the light transmission through samples of aqueous ammonium nitrate solutions of known concentrations which were cooled in a sample cell that was provided with a stirrer. It is believed that the curved top portions of the several curves were due to small amounts of surface scum being entrained in the solution by the stirrer. It should be observed, however, that the light transmission properties decreases rapidly at characteristic temperatures which are representative of the concentrations of the solutions.

The analyzer of FIGURE 2 is operated so that a constant light transmission is maintained through cell 42. This transmission is set in accordance with a desired ammonium nitrate concentration to be maintained in the prilling system. The apparatus can conveniently be set so that the light transmission through cell 42 represents approximately 50 percent of the maximum transmission. The temperature of the sample circulated through cell 42 is then adjusted so that the desired light transmission is maintained. The solution in cell 42 is thus maintained at approximately the fudge point. This temperature control is accomplished by regulating the flow of coolant through jacket 45, the rate of sample flow through conduit 41, or both. If the measured light transmission increases, the sample is cooled by increasing the flow of coolant, or decreasing the sample flow, or both, for example. The sample supplied to the inlet of conduit 41 normally is at a temperature of approximately 140° C. The sample is cooled in conduit 41 to a temperature in the general range of approximately 125 to 127° C., which represents the fudge point of a solution having a concentration of approximately 95 to 95.5 percent. The temperature of the sample in cell 42 is thus regulated so that a constant light transmission is maintained. This particular temperature then represents the fudge point of the ammonium nitrate solution, which in turn is representative of the concentration of the solution. This temperature is measured by recorder-controller 55.

Controller 55 provides an output signal which is representative of the measured temperature. This signal is applied in the control system of FIGURE 1 to adjust the amount of steam supplied to heat exchanger 19. If the measured temperature rises above a predetermined value, 126° C. for example, less steam is supplied to heat exchanger 19. Conversely, if the measured temperature falls below a predetermined value, 125° C. for example, more steam is supplied to heat exchanger 19. In this manner, it is possible to maintain the concentration of the ammonium nitrate solution passed to tower 37 at a constant predetermined value which gives the best prills in a given prilling tower.

Figure 4:
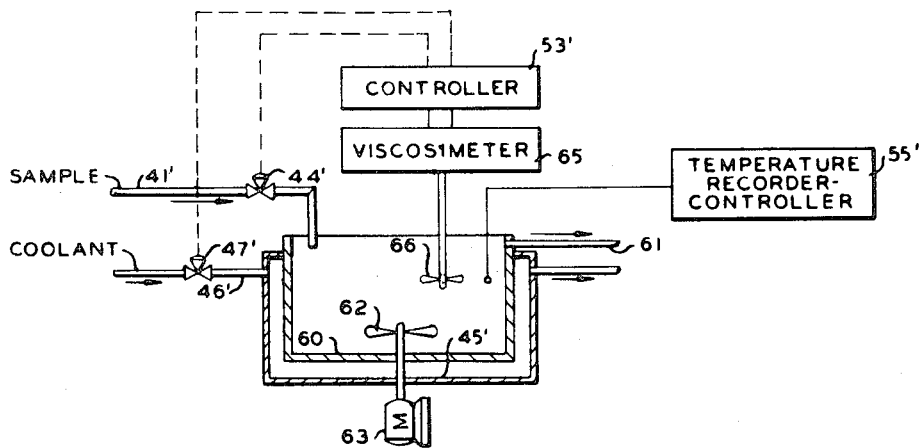
FIGURE 4 is a schematic representation of a second embodiment of the analyzer of this invention.

A second embodiment of the control system of this invention is illustrated in FIGURE 4. The system of FIGURE 4 is similar in several respects to that of FIGURE 2 and corresponding elements are designated by like primed reference numerals. The sample stream to be analyzed is introduced into a tank 60 and is removed through an overflow conduit 61. Tank 60 is provided with a jacket 45' through which a coolant is circulated. The sample in tank 60 is agitated by means of a stirrer 62 which is rotated by a motor 63. The apparent viscosity of the sample in tank 60 is measured continuously by means of a viscosimeter 65. This instrument can comprise a stirrer 66 which is rotated by means of an electrical motor at a constant velocity. The current supplied to the motor which is required to maintain this velocity is a function of the apparent viscosity of the solution in which stirrer 66 is rotated. A signal representative of this current is supplied to controller 53 which adjusts the temperature of the solution in tank 60 to maintain to a constant viscosity in tank 60. It has been discovered that the viscosity of an ammonium nitrate solution increases substantially when the solution is cooled to the fudge point. This increase in viscosity is analogous to the decrease in light transmission, as illustrated in FIGURE 3, and is nearly as abrupt.

In one specific embodiment of the control system of this invention, a 55 percent aqueous solution of nitric acid is added to neutralizer 10 at a rate of approximately 54.6 gallons per minute. Ammonia at a pressure of approximately 75 pounds per square inch gauge and at a temperature of 40° C. is supplied to neutralizer 10 at a rate of 365 cubic feet per minute. The resulting solution is circulated through conduit 11 at a rate of approximately 5.300 gallons per minute. This provides approximately a 75 percent aqueous ammonium nitrate solution in neutralizer 10 at a temperature of approximately 175° C. and at a pressure of 65 pounds per square inch absolute. The solution is concentrated to approximately 95 percent in concentrator 18 which is maintained at a temperature of approximately 140° C. and at a pressure of 280 millimeters of mercury. The resulting solution is sprayed into the top of tower 37 at a rate of approximately 37.8 gallons per minute. Air is introduced into tower 37 at a rate of approximately 150,000 cubic feet per minute. The height of column 37 is approximately 130 feet, and the prills are removed at a temperature of approximately 75° C. Sufficient steam is supplied to heat exchanger 19 to maintain the concentration of ammonium nitrate in concentrator 18 at the indicated value.

It should be evident that the analyzer of this invention is applicable to measuring the fudge point of any solution which exhibits the property of a rapid decrease in light transmission or a rapid increase in viscosity at the fudge point. The analyzer can also be employed to determine the cloud point of oils. A sample of the oil to be measured can be cooled and passed through sample cell 42. A rapid decrease in light transmission indicates the cloud point. The instrument is also useful in indicating boiling points of solutions. In such an application, a heating medium is circulated through jacket 45 to increase the temperature of the solution. The boiling point is indicated by the formation of bubbles in cell 42 which decreases the light transmission through the solution. The formation of the bubbles are indicative of the boiling point.

While the invention has been described in conjunction with present preferred embodiments, it should be evident that it is not limited thereto.

What is claimed is:

1. A method of producing an aqueous solution of ammonium nitrate of predetermined concentration which comprises mixing nitric acid and ammonia to produce ammonium nitrate, heating the ammonium nitrate to evaporate water therefrom, passing a sample of the resulting concentrated ammonium nitrate to a sample chamber, cooling the sample passed to the chamber so that the sample in the chamber is maintained at approximately the fudge point of the ammonium nitrate solution, measuring the temperature of the solution in the sample chamber, and adjusting the heating of the ammonium nitrate in response to the temperature measurement to tend to maintain the measured temperature constant.

2. A method of producing an aqueous solution of ammonium nitrate of predetermined concentration which comprises mixing nitric acid and ammonia to produce ammonium nitrate, heating the ammonium nitrate to evaporate water therefrom, passing a sample of the resulting concentrated ammonium nitrate to a sample chamber, passing a beam of radition through the sample in the chamber, cooling the sample passed to the chamber so that the radiation transmitted through the chamber remains constant at a value representing approximately the fudge point of the ammonium nitrate solution, measuring the temperature of the solution in the sample chamber, and adjusting the heating of the ammonium nitrate in response to the temperature measurement to tend to maintain the measured temperature constant.

3. A method of producing an aqueous solution of ammonium nitrate of predetermined concentration which comprises mixing nitric acid and ammonia to produce ammonium nitrate, heating the ammonium nitrate to evaporate water therefrom, passing a sample of the resulting concentrated ammonium nitrate to a sample chamber, measuring the apparent viscosity of the sample in the chamber, cooling the sample passed to the chamber so that the apparent viscosity of the sample in the chamber remains constant at a value representing approximately the fudge point of the ammonium nitrate solution, measuring the temperature of the solution in the sample chamber, and adjusting the heating of the ammonium nitrate in response to the temperature measurement to tend to maintain the measured temperature constant.

4. A method of producing an aqueous solution of ammonium nitrate of predetermined concentration which comprises mixing nitric acid and ammonia to produce ammonium nitrate, concentrating the ammonium nitrate to evaporate water therefrom, passing a sample of the resulting concentrated ammonium nitrate to a sample chamber, cooling the sample passed to the chamber so that the sample in the chamber is maintained at approximately the fudge point of the ammonium nitrate solution, measuring the temperature of the solution in the sample chamber, and adjusting the concentrating of the ammonium nitrate in response to the temperature measurement to tend to maintain the measured temperature constant.

5. Apparatus for producing an aqueous solution of ammonium nitrate of predetermined concentration which comprises mixing means to contact nitric acid with ammonia, evaporating means having heating means operably associated with said evaporating means so as to supply heat thereto, means to pass ammonium nitrate from said mixing means to said evaporating means, means to withdraw ammonium nitrate from said evaporating means, a sample cell, means to pass a sample from said means to withdraw through said cell, means to cool the sample passed to said cell, means to measure a property of the sample in said cell representative of the fudge point of the ammonium nitrate solution, means responsive to said means to measure to adjust said means to cool so that the sample in said cell is maintained at approximately said fudge point, means to measure the temperature of fluid in said cell, and means responsive to said means to measure temperature to adjust said heating means operably associated with said evaporating means so as to tend to maintain the measured temperature constant.

6. Apparatus for producing an aqueous solution of ammonium nitrate of predetermined concentration which comprises mixing means to contact nitric acid with ammonia, evaporating means having heating means operably associated with said evaporating means so as to supply heat thereto, means to pass ammonium nitrate from said mixing means to said evaporating means, means to withdraw ammonium nitrate from said evaporating means, a sample cell, means to pass a sample from said means to withdraw through said cell, means to cool the sample passed to said cell, means to pass a beam of radiation through said cell, means to measure the transmitted radiation, means responsive to said means to measure to adjust said means to cool so that the sample in said cell is maintained at approximately said fudge point, means to measure the temperature of fluid in said cell, and means responsive to said means to measure temperature to adjust said heating means operably associated with said evaporating means so as to tend to maintain the measured temperature constant.

7. Apparatus for producing an aqueous solution of ammonium nitrate of predetermined concentration which comprises mixing means to contact nitric acid with ammonia, evaporating means having heating means operably associated with said evaporating means so as to supply heat thereto, means to pass ammonium nitrate from said mixing means to said evaporating means, means to withdraw ammonium nitrate from said evaporating means, a sample cell, means to pass a sample from said means to withdraw through said cell, means to cool the sample passed to said cell, means to measure the apparent viscosity of the fluid in said cell, means responsive to said means to measure to adjust said means to cool so that the sample in said cell is maintained at approximately said fudge point, means to measure the temperature of fluid in said cell, and means responsive to said means to adjust said heating means operably associated with said evaporating means so as to tend to maintain the measured temperature constant.

8. Apparatus for producing an aqueous solution of ammonium nitrate of predetermined concentration which comprises mixing means to contact nitric acid with ammonia, concentrating means, means to pass ammonium nitrate from said mixing means to said concentrating means, means to withdraw concentrated ammonium nitrate from said concentrating means, a sample cell, means to pass a sample from said means to withdraw through said cell, means to cool the sample passed to said cell, means to measure a property of the sample in said cell representative of the fudge point of the ammonium nitrate solution, means responsive to said means to measure to adjust said means to cool so that the sample in said cell is maintained at approximately said fudge point, means to measure the temperature of fluid in said cell, and means responsive to said means to measure temperature to adjust said concentrating means to tend to maintain the measured temperature constant.

References Cited by the Examiner

UNITED STATES PATENTS

| | | | |
|---|---|---|---|
| 1,534,091 | 4/25 | Smoot | 73—55 X |
| 1,654,614 | 1/28 | Smith | 73—55 X |
| 2,650,660 | 9/53 | Martin et al. | 23—103 X |
| 2,672,751 | 3/54 | Jupper et al. | 73—17 |
| 2,952,152 | 9/60 | Fisher et al. | 73—17 |

FOREIGN PATENTS

| | | |
|---|---|---|
| 466,795 | 6/37 | Great Britain. |
| 474,285 | 6/51 | Canada. |

MAURICE A. BRINDISI, *Primary Examiner.*